(12) United States Patent
Mullen et al.

(10) Patent No.: US 8,827,207 B2
(45) Date of Patent: Sep. 9, 2014

(54) ICE PROTECTION SYSTEM

(75) Inventors: James Mullen, North Canton, OH (US);
Gregory Schroeder, Ottawa, OH (US)

(73) Assignee: Goodrich Corporation, Charlotte, NC (US)

( * ) Notice: Subject to any disclaimer, the term of this patent is extended or adjusted under 35 U.S.C. 154(b) by 210 days.

(21) Appl. No.: 13/455,163

(22) Filed: Apr. 25, 2012

(65) Prior Publication Data

US 2012/0280084 A1 Nov. 8, 2012

Related U.S. Application Data

(60) Provisional application No. 61/482,169, filed on May 3, 2011.

(51) Int. Cl.
*B64D 15/12* (2006.01)
*B64D 15/14* (2006.01)

(52) U.S. Cl.
CPC ............. *B64D 15/12* (2013.01); *B64D 15/14* (2013.01)
USPC ..................................................... 244/134 D

(58) Field of Classification Search
USPC .......... 244/134 D, 134 R; 60/39.093; 416/95; 219/201, 483, 492, 508, 510; 307/9.1, 307/10.1, 29
See application file for complete search history.

(56) References Cited

U.S. PATENT DOCUMENTS

| | | | |
|---|---|---|---|
| 3,015,744 A * | 1/1962 | Wesolowski | 310/234 |
| 3,496,331 A * | 2/1970 | Fourcade et al. | 219/201 |
| 3,657,514 A | 4/1972 | Adams | |
| 4,292,502 A | 9/1981 | Adams | |
| 4,410,794 A | 10/1983 | Williams | |
| 4,424,947 A | 1/1984 | Adams et al. | |
| 4,494,715 A | 1/1985 | Weisend, Jr. | |
| 4,743,777 A * | 5/1988 | Shilling et al. | 290/46 |
| 5,097,195 A * | 3/1992 | Raad et al. | 322/10 |
| 5,737,210 A | 4/1998 | Barahia | |
| 5,947,418 A | 9/1999 | Bessiere et al. | |
| 6,338,455 B1 | 1/2002 | Rauch et al. | |
| 6,427,946 B1 | 8/2002 | Petrenko | |
| 6,753,513 B2 | 6/2004 | Goldberg et al. | |
| 7,211,772 B2 | 5/2007 | Carpino, II et al. | |
| 7,262,712 B2 | 8/2007 | Greene | |
| 7,604,202 B2 | 10/2009 | Froman et al. | |
| 7,648,368 B2 | 1/2010 | Fahrner et al. | |
| 7,763,833 B2 | 7/2010 | Hindel et al. | |
| 7,913,952 B2 | 3/2011 | Boschet et al. | |
| 7,926,763 B2 | 4/2011 | Froman | |
| 2006/0043240 A1 | 3/2006 | Hindel et al. | |
| 2008/0111028 A1 | 5/2008 | Kumar et al. | |

(Continued)

OTHER PUBLICATIONS

European Search Report for Application No. EP1220102.

(Continued)

*Primary Examiner* — Philip J Bonzell
(74) *Attorney, Agent, or Firm* — Cantor Colburn LLP

(57) ABSTRACT

An ice protection system (40) comprising electrothermal devices (41-44) having zones (41P-44P, 41L-44L, 41S-44S, 41T-44T) associated with respective surface regions of rotor blades. Each zone involves electric load (R) which converts supplied electrical power from one phase of a three-phase power system into heat. The combined load of the A-phase zones, the combined load of the B-phase zones, and the combined load of the C-phase zones are approximately equal.

20 Claims, 11 Drawing Sheets

(56) References Cited

U.S. PATENT DOCUMENTS

| | | |
|---|---|---|
| 2008/0152494 A1 | 6/2008 | Froman |
| 2009/0230239 A1 | 9/2009 | Stothers |
| 2010/0206990 A1 | 8/2010 | Petrenko |
| 2011/0024567 A1 | 2/2011 | Blackwelder et al. |
| 2011/0080042 A1* | 4/2011 | Kumar .......................... 307/9.1 |
| 2011/0290942 A1 | 12/2011 | Imbert et al. |
| 2012/0074262 A1 | 3/2012 | Chuc et al. |

OTHER PUBLICATIONS

EP Communication pursuant to Rules 70(2) and 70a(2) EPC and reference to Rule 39(1) EPC, mailed Nov. 12, 2012, 2 pages.

EP Communicaiton pursuant to Decision of the President of the European Patent Office dated Aug. 9, 212 on the filing of priority documents, mailed Nov. 28, 2012, 1 page.

European Search Report for application EP 12250102.6, mailed Sep. 9, 2012, 5 pages.

* cited by examiner

ICE PROTECTION SYSTEM

RELATED APPLICATION

This application claims priority under 35 USC §119(e) to U.S. Provisional Patent Application No. 61/482,169 filed on May 3, 2011. The entire disclosure of this provisional patent application is hereby incorporated by reference.

BACKGROUND

A rotary-wing aircraft, such as a helicopter, can comprise a main rotor to provide vertical lift and a tail rotor to counter torque created by the main rotor. The aircraft will commonly employ an ice protection system for its tail rotor. If this ice protection system includes electrothermal devices, the relevant power system will often supply three-phase alternating current power.

SUMMARY

An ice protection system is provided for a tail rotor or other constitution of related ice-susceptible components. The system includes electrothermal devices adapted to allocate power-phase paths so as to insure ice-protection synchronization and phase-to-phase load balance. And the ice protection system can be constructed with a lower package weight, easier assembly steps, simplified installation procedures, reduced problem points, and/or improved durability.

DRAWINGS

DESCRIPTION

Figure 1:
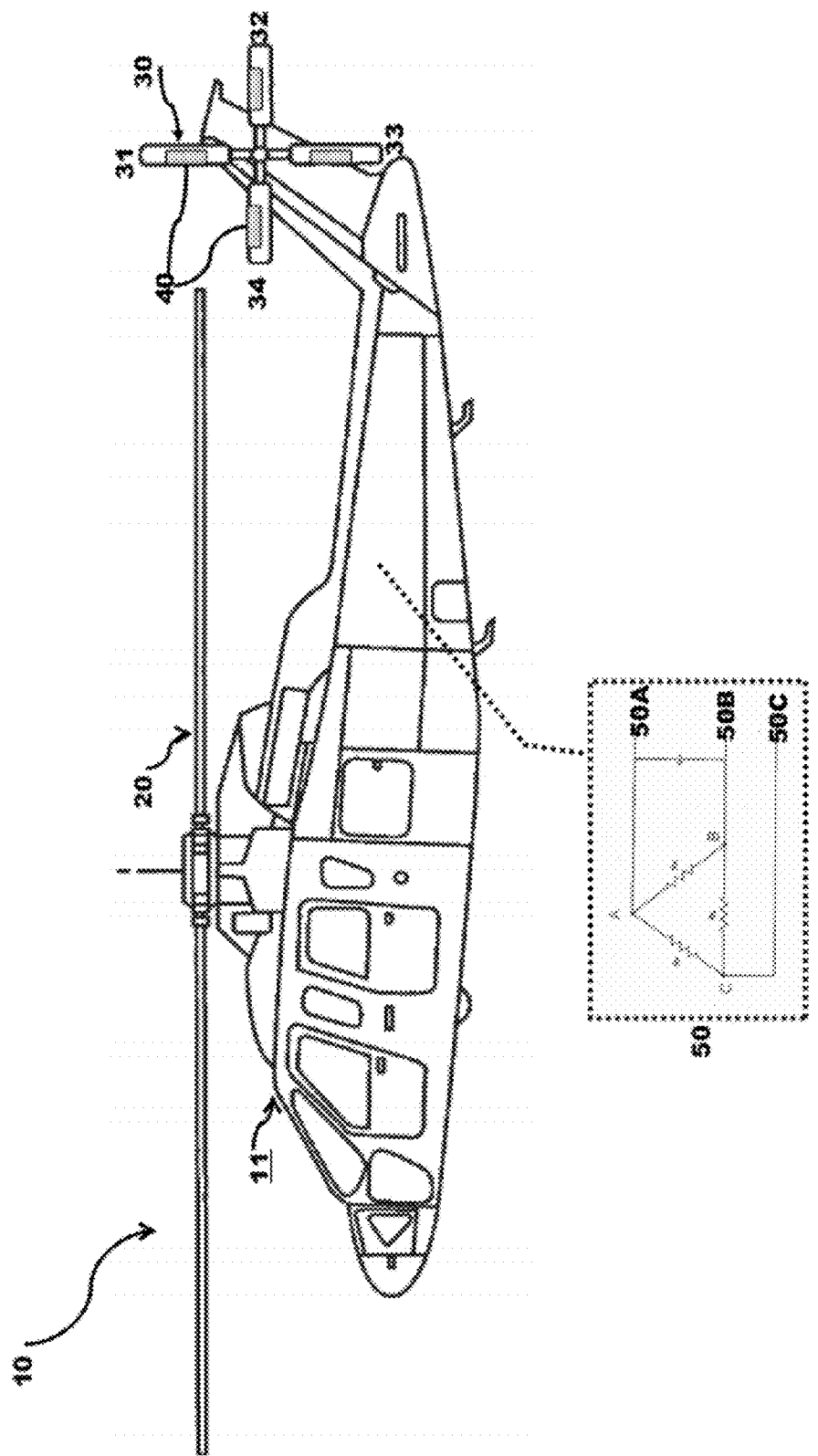
FIG. 1 shows an aircraft with the ice protection system installed on its tail rotor.

Referring now to the drawings, and initially to FIG. 1, a rotory-wing aircraft 10 (e.g., a helicopter) is shown. The aircraft 10 can comprises a fuselage 11, a main rotor 20, and a tail rotor 30. The main rotor 20 can be mounted to the fuselage to provide vertical lift and the tail rotor 30 can be mounted to the fuselage to counter torque. The tail rotor 30 has a blade count that is not equal to a multiple of three. In the illustrated aircraft 10, the tail rotor 30 has four blades 31, 32, 33, and 34

The aircraft 10 also comprises an ice protection system 40 for its tail rotor 30 and more particularly the blades 31-34 of the rotor 30. The ice protection system 40 functions electrothermally by converting electrical power into heat. This heat is used to prevent ice from over-accumulating on the rotor blades 31-34 when the aircraft 10 is in flight.

The aircraft 10 further comprises an onboard power system 50 which supplies electrical power to the ice protection system 40. Specifically, the system 50 provides three-phase alternating-current (AC) power (e.g., 115 volts, 400 cycle). The ice protection system (40) receives electric power through an A-phase line 50A, a B-phase line 50B, and a C-phase line 50C.

With the tail rotor 30, as with most constitutions of related ice-susceptible components, it is significant to synchronize ice protection to avoid inter-component weight discrepancies and/or airfoil differences. In other words, for example, deicing (and/or or anti-icing) is performed substantially simultaneously on akin areas of related components. And when using a three-phase power system, such as the system 50, it is important to pull the same load from each phase is equal to prevent a system load imbalance.

Figure 2:
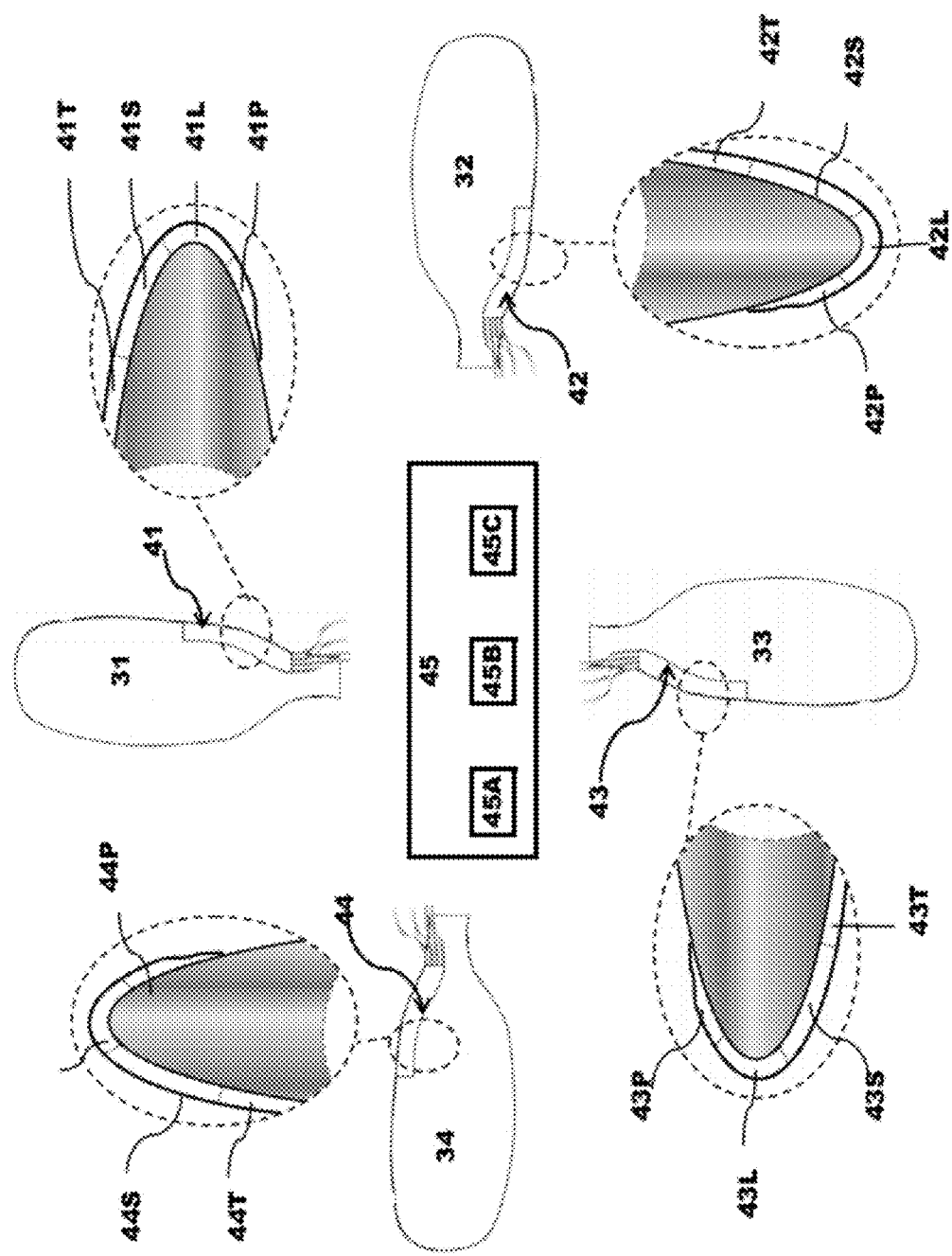
FIG. 2 shows the blades of the tail rotor and their electrothermnal devices in more detail.

Referring now to FIG. 2, the ice protection system 40 includes four electrothermal heating devices 41-44, one for each blade 31-34 of the tail rotor 30. Each heating device 41-44 is divided into heating zones corresponding to certain regions of the respective blade 31-34. In the illustrated embodiment, each device 41-44 has a zone 41P-44P corresponding to the pressure region of the blade, a zone 41L-44L corresponding to its leading-edge region, a zone 41S-44S corresponding to its suction region, and a zone 41T-44T corresponding to its trailing region.

The ice protection system 40 further includes a connection device 45 for electrical connections among the devices 41-44 and to the power system 50. The connection device 45 includes an A-phase connector 45A for connection to the A-phase line 50A of the power system 50, a B-phase connector 45B for connection to the B-phase line 50B of the power system 50, and a C-phase connector 45C for connection to the C-phase line 50C of the power system 50. Although the connection device 45 is schematically shown as a harness board in the drawings, any construction may be used that accommodates the necessary electrical connections.

Figure 3:
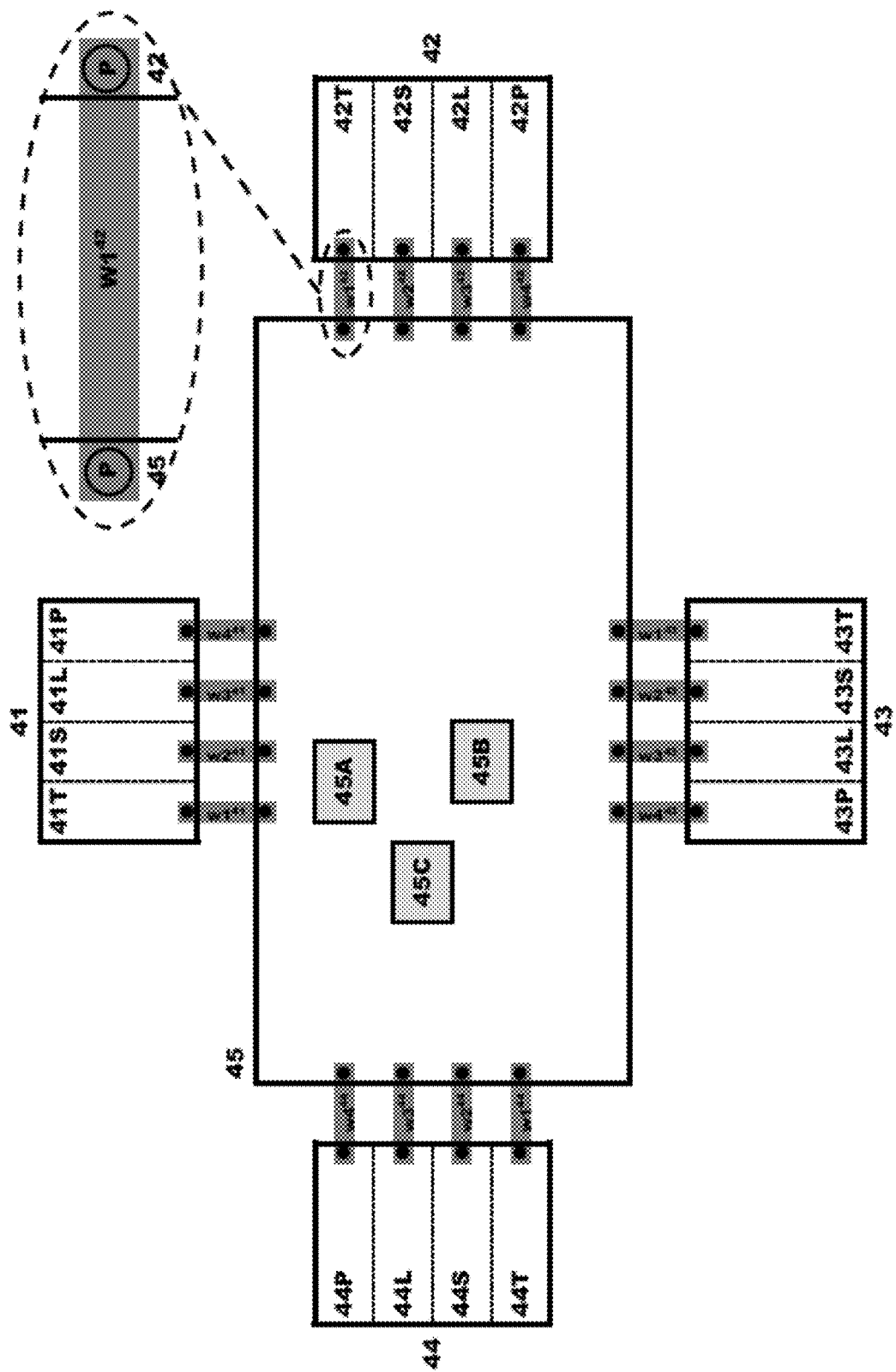
FIG. 3 shows the electrothermnal devices in a flattened form.

In FIG. 3, the electrothermal devices 41-44 are drawn in a flattened condition and arranged around the connection device 45. Each electrothermal device 41-44 has four wires w1-w4 electrically extending between it and the connection device 45. For each wire W, a connection pin P electrically connects one end of the wire W to the respective electrothermal device 41/42/43/44 and another connection pin P connects the other end of the wire W to the connection device 45. This minimal number of wires/pins can help eases assembly, simplify installation, and/or eliminate potential failure points of the ice protection system 40.

Figure 4:
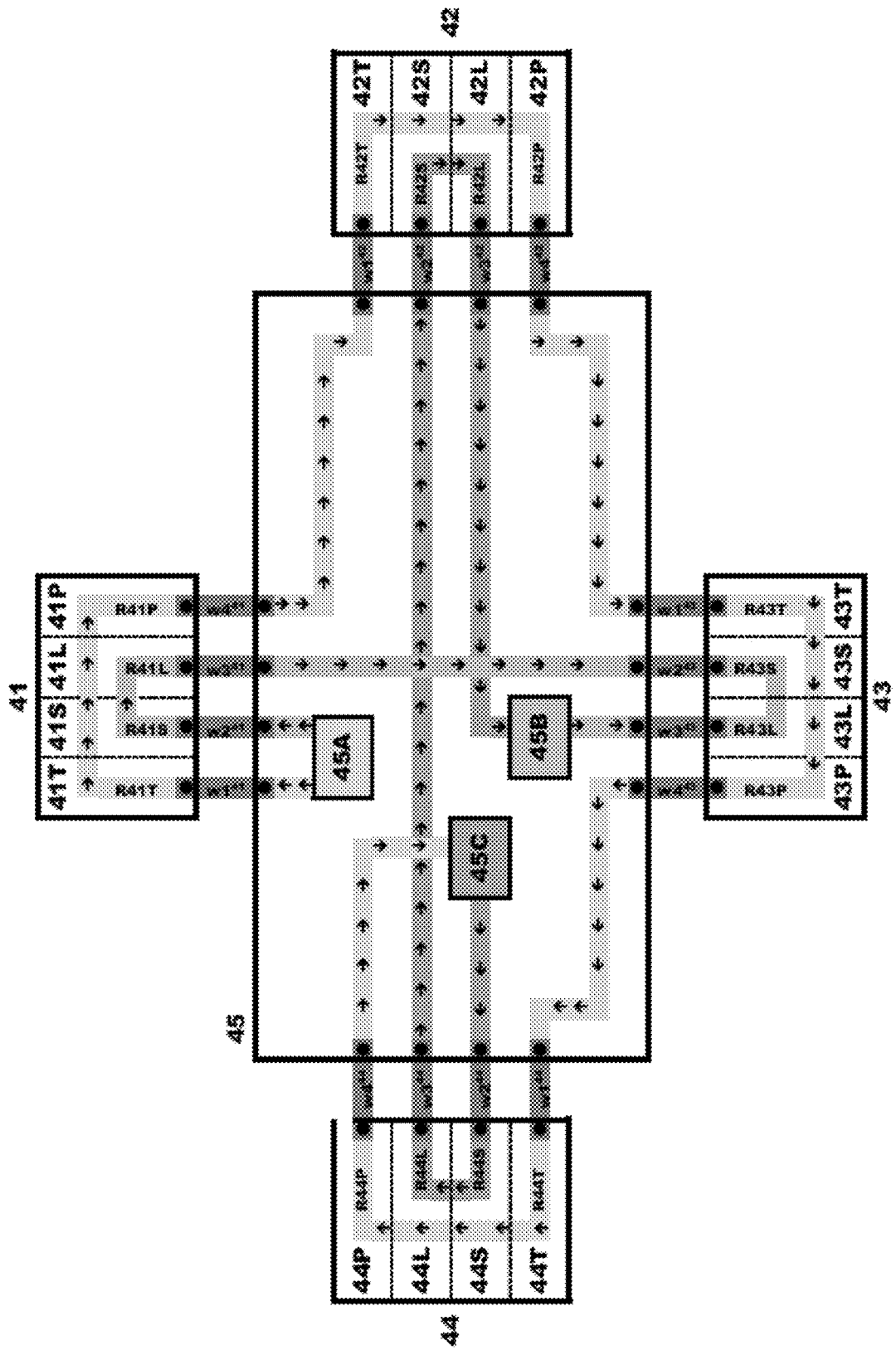
FIG. 4 and FIGS. 4A-4C show electrical wiring, loads, paths, and passes of the ice protection system.

In FIG. 4, the electrical-path scheme for the ice protection system 40 is schematically shown. Each zone involves an electric load R which converts supplied electrical power into heat which prevents or removes ice accumulation on the relevant blade region. The heat necessary to accomplish such ice protection can vary among regions. For example, the aft pressure and trailing regions will usually require less heat than the leading-edge and suction regions. Accordingly, the electric loads R will differ among different zones of each electrothermal device 41-44.

While electrical loads R will differ by zone within each device 41-44, comparable zones, and especially opposing comparable zones, can have equivalent electric loads R to insure that ice-protection synchronization. For example, the loads of the leading-edge zone 41L and the suction zone 41S of the first electrothermal device 41 are preferably equivalent to the loads of the leading-edge zone 43L and the suction zone 43L of the third electrothermal device 43. And the loads of the leading-edge zone 42L and the suction zone 42S of the second electrothermal device 42 are preferably equivalent to the loads of the leading-edge zone 44L and the suction zone 44L of the fourth electrothermal device 44.

Figure 4A:
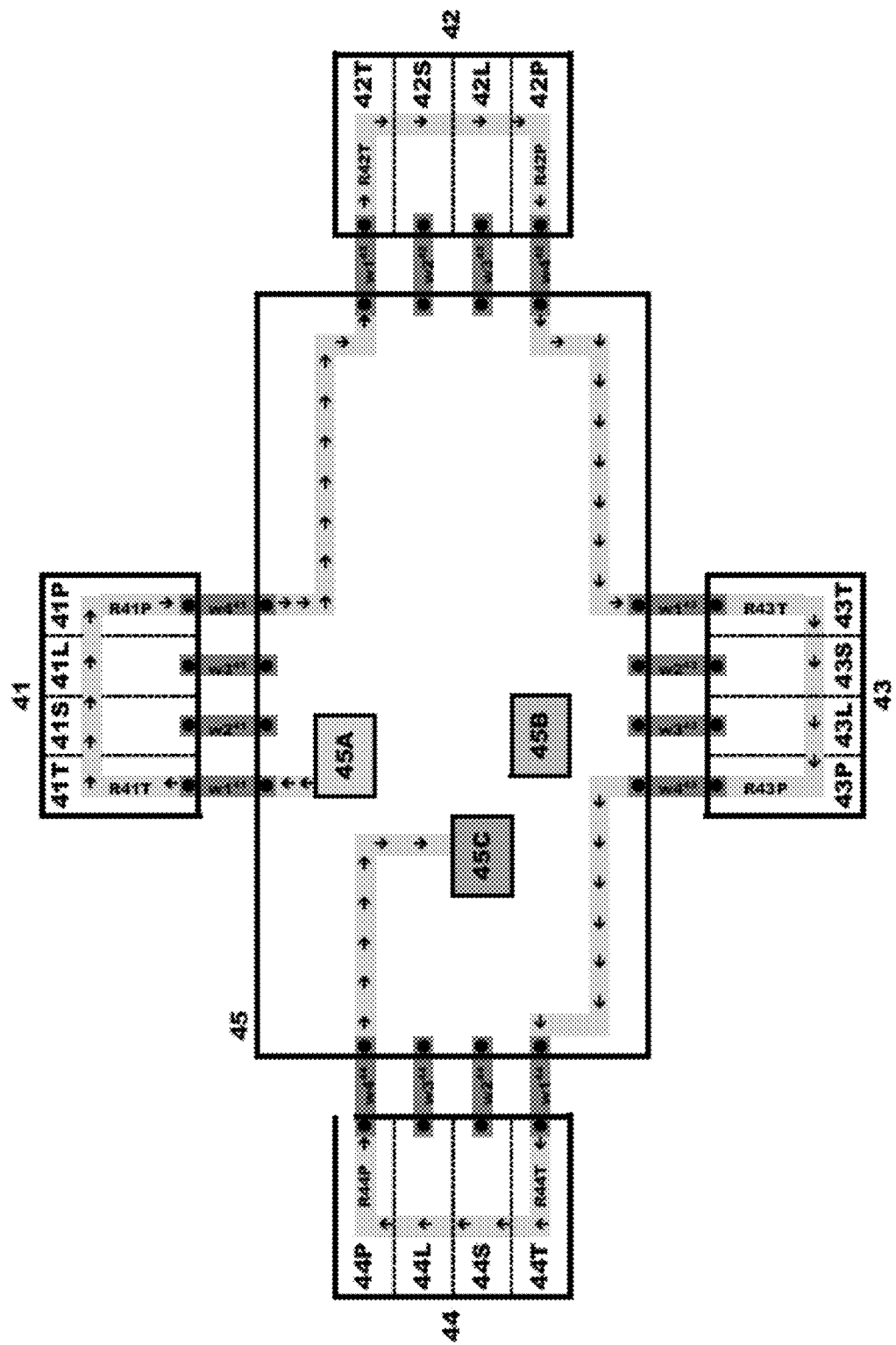

As is best seen by referring additionally to FIG. 4A, electric power supplied through the A-phase connector 45A follows a path from the connector device 45 to the first device 41 (via wire $W1^{41}$), back to the connector device 45 (via wire $W4^{41}$).

The path continues sequentially through the remaining devices 42-44 in the same manner. Specifically, the path goes from the connector device 45 to the second device 42 (via wire $W1^{42}$), back to the connector device 45 (via wire $W4^{42}$), to the third device 43 (via wire $W1^{43}$), back to the connector device 45 (via wire $W4^{43}$), to the fourth device 44 (via wire $W1^{44}$), and back to the connector device 45 (via wire $W4^{44}$). The electric path returns to the power system 50 via the C-phase connector 45C.

The A-phase electric path has two passes in each device 41-44. Specifically, it passes through the trailing zone 41T/42T/43T/44T and then through the pressure zone 41P/42P/43P/44P of each device 41/42/43/44. The combined load RA of the A-phase electrical path is therefore equal to the sum of the loads of the heating elements in the trailing and pressure zones (i.e., R41T+R41P+R42T+R42P+R43T+R43P+R44T+R44P).

Figure 4B:
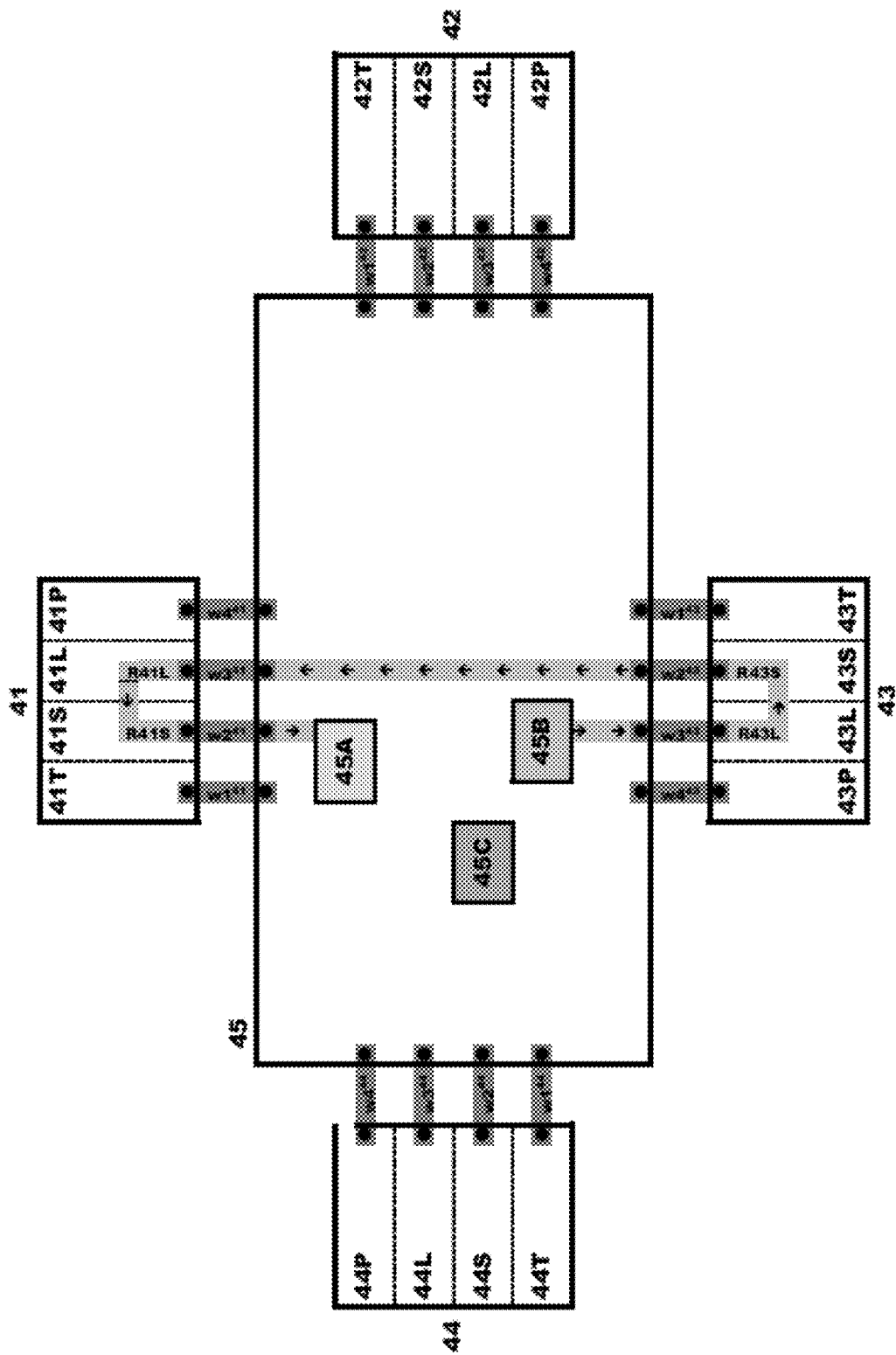

As is best seen by referring additionally to FIG. 4B, electric power supplied through the B-phase connector 45B follows a path from the connector device 45 to the third device 43 (via wire $W3^{43}$), back to the connector device 45 (via wire $W2^{43}$), to the first device 41 (via wire $W3^{41}$), back to the connector device 45 (via wire $W2^{41}$), and then returns to the power system 50 via connector 45A. The B-phase path passes through the leading-edge zone 43L of the third device 43 and then through its suction zone 43S. And it passes through the leading-edge zone 41L of the first device 41 and then through its suction zone 41S. The combined load RB of the B-phase electrical path is therefore equal to the sum of the loads of the heating elements in the leading-edge and suction zones of the third device 43 and the first device 41 (i.e., R43L+R43S+R41L+R41S).

Figure 4C:
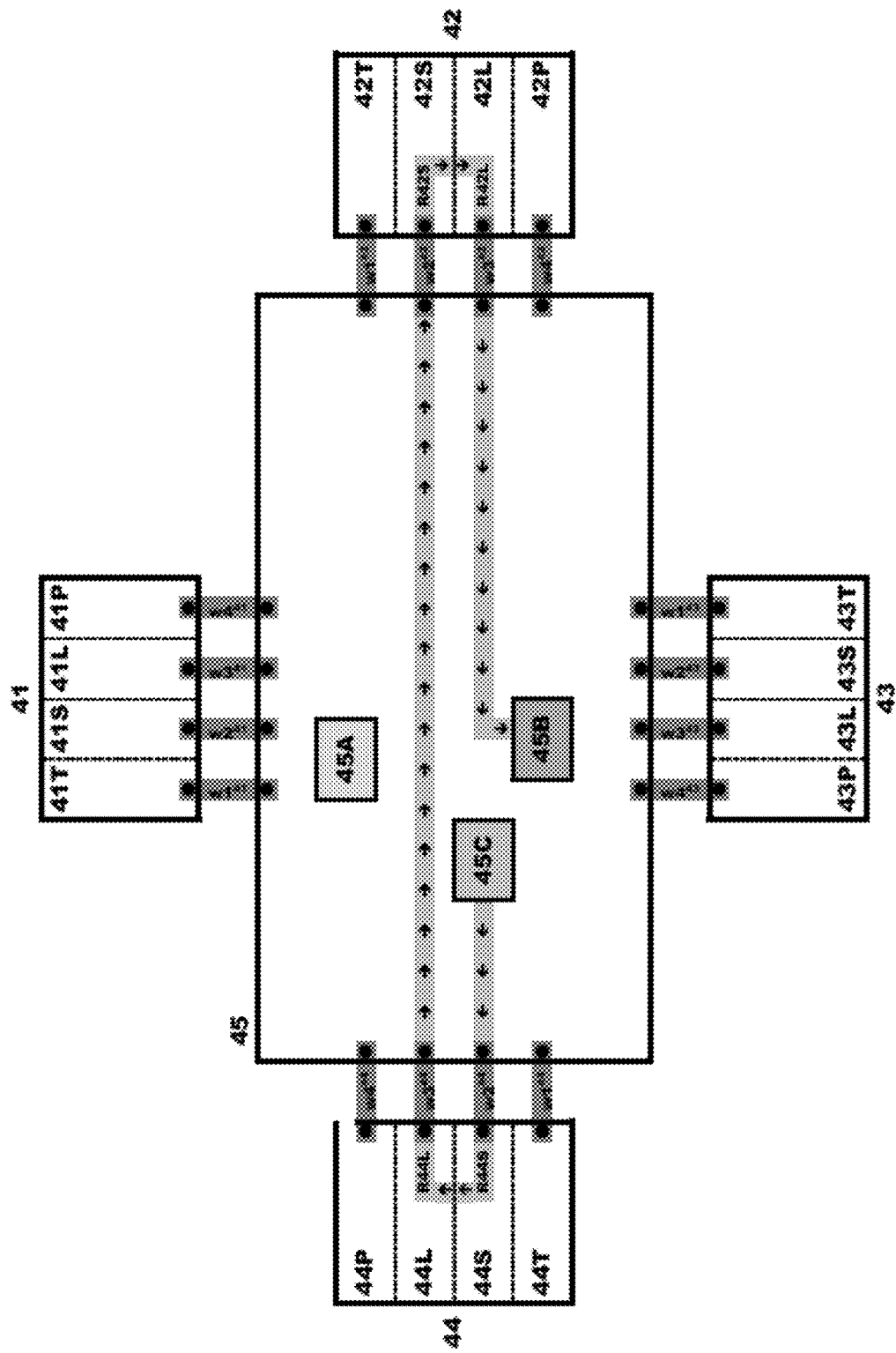

As is best seen by referring additionally to FIG. 4C, electric power supplied through the C-phase connector 45C follows the same path as the B-phase path, except through the fourth device 44 and the second device 42, and returning to the power system 50 via the connector 45B. The combined load RC of the C-phase electrical path is equal to the heating elements in the leading-edge and suction zones of the fourth device 44 and the second device 42 (i.e., R44L+R44S+R42L+R42S).

Load balancing is accomplished in the ice protection system 40 by the combined load of the A-phase zones (R41T+R41P+R42T+R42P+R43T+R43P+R44T+R44P), a combined load of the B-phase zones (R43L+R43S+R41L+R41S), and a combined load of the C-phase zones (R44L+R44S+R42L+R42S) being approximately equal. This can be achieved by dimensioning the zones and/or arranging the power densities to attain this equality.

As was alluded to above, the pressure zones 41P-44P and the trailing zones 41T-44T require less heat, and thus less load, to achieve adequate ice protection. As such, the corresponding electrical loads R41P-R44P and R41T-R44T can be substantially less than their counterparts in the leading-edge and suction zones. Thus, while the number of A-phase zones is greater than the number of B-phase zones or C-phase zones, the RA load can still be balanced with the RB load and the RC load.

Although the leading-edge zones 41L-44L and the suction zones 41S-44S require more load to achieve adequate ice protection, the responsibility is split between B-phase zones and C-phase zones. And to insure ice-protection synchronization between opposing comparable zones, the B-phase zones occupy the first and third electrothermal devices 41 and 43, while the C-phase zones occupy the second and fourth electrothermal devices 42 and 44. Furthermore, the B-phase zones are connected in series with each other and the C-phase zones are connected in series with each other to further the synchronization cause.

While the drawings show certain phases on certain zones, other organizations are possible and contemplated. The ice protection system 40 can include any phase-to-component layout wherein each electrothermal device 41-44 receives power from two but not three phases, and wherein the combined load RA of the A-phase zones, the combined load RB of the B-phase zones, and the combined load RC of the C-phase zones are approximately equal.

Figure 5:
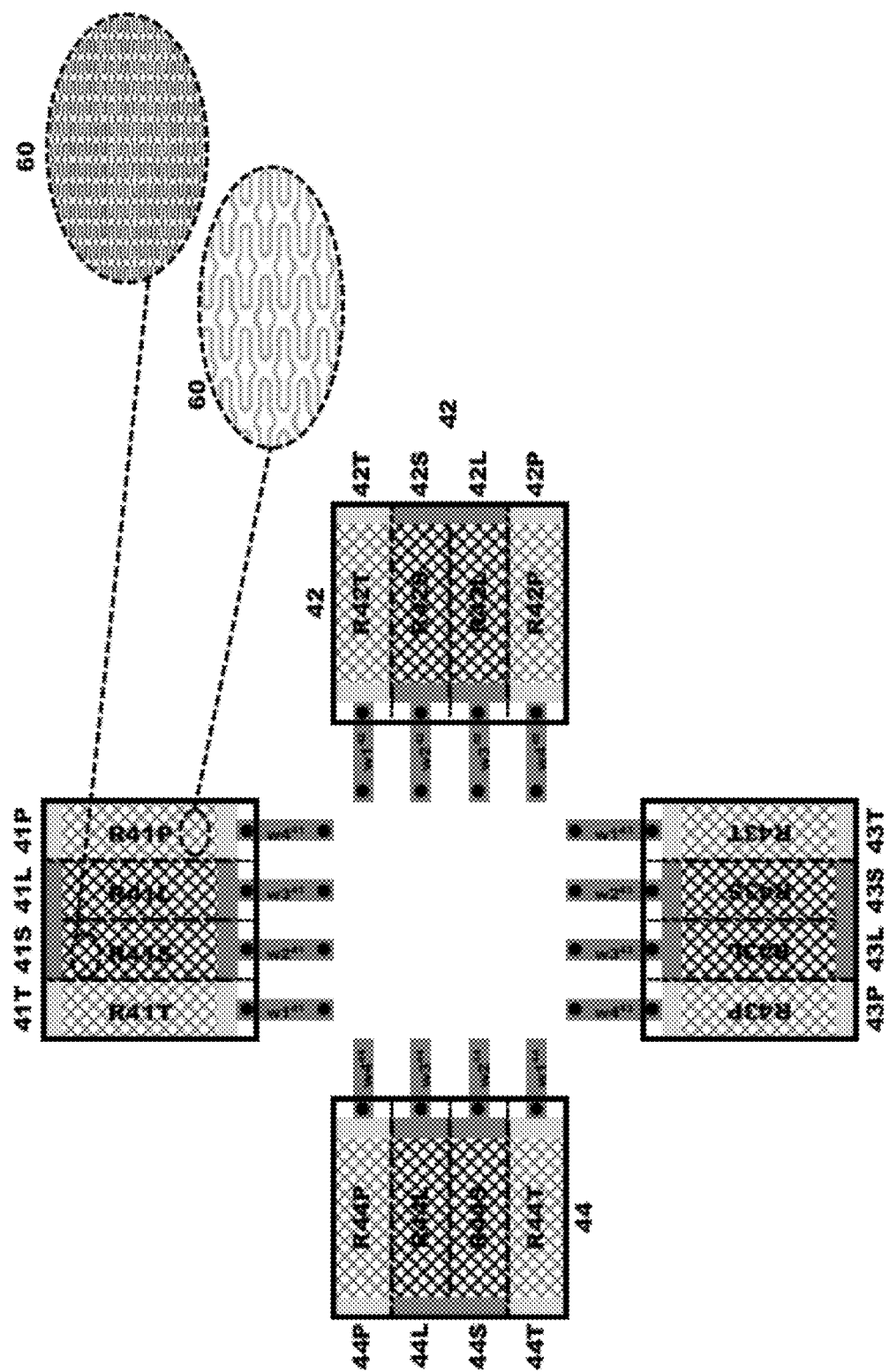
FIG. 5 and FIGS. 5A-5C show heater arrangements within the ice protection system.

As shown in FIG. 5, the electric loads R can be provided by heating elements wherein resistance is created by a patterned strip 60 of conductive material. (See e.g., U.S. Pat. No. 7,211,772 and/or U.S. Pat. No. 7,763,833.) The pattern includes a plurality of holes arranged so that the electrical path must twist and turn around holes. In other words, there is no straight line corridor for the electrical path to follow.

With such a hole pattern, chinks in the heating element (due to, for example, fatigue or foreign object damage) are much less likely to defeat the electrical path. As a general rule, this robustness increases with the width of the patterned strip 60. The four-wire layout of the electrothermal devices 41-45 make wider strips 60 possible and thus can contribute to the durability of the ice protection system 40. Moreover, the holes pattern can be tailored to meet desired power density requirements, which can prove useful when designing heating elements to achieve the above-discussed equality among phase loads.

Figure 5A:
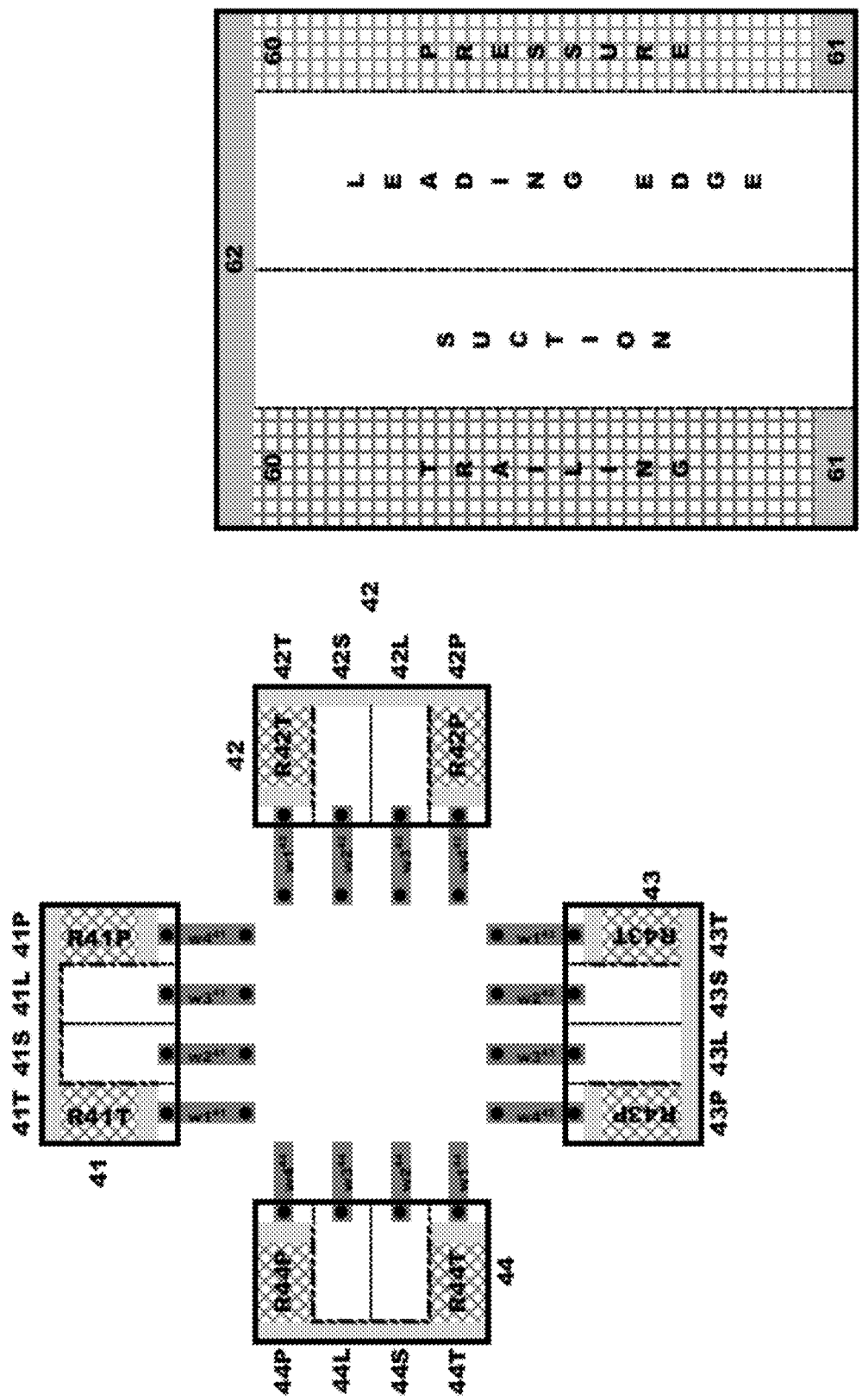
Figure 5B:
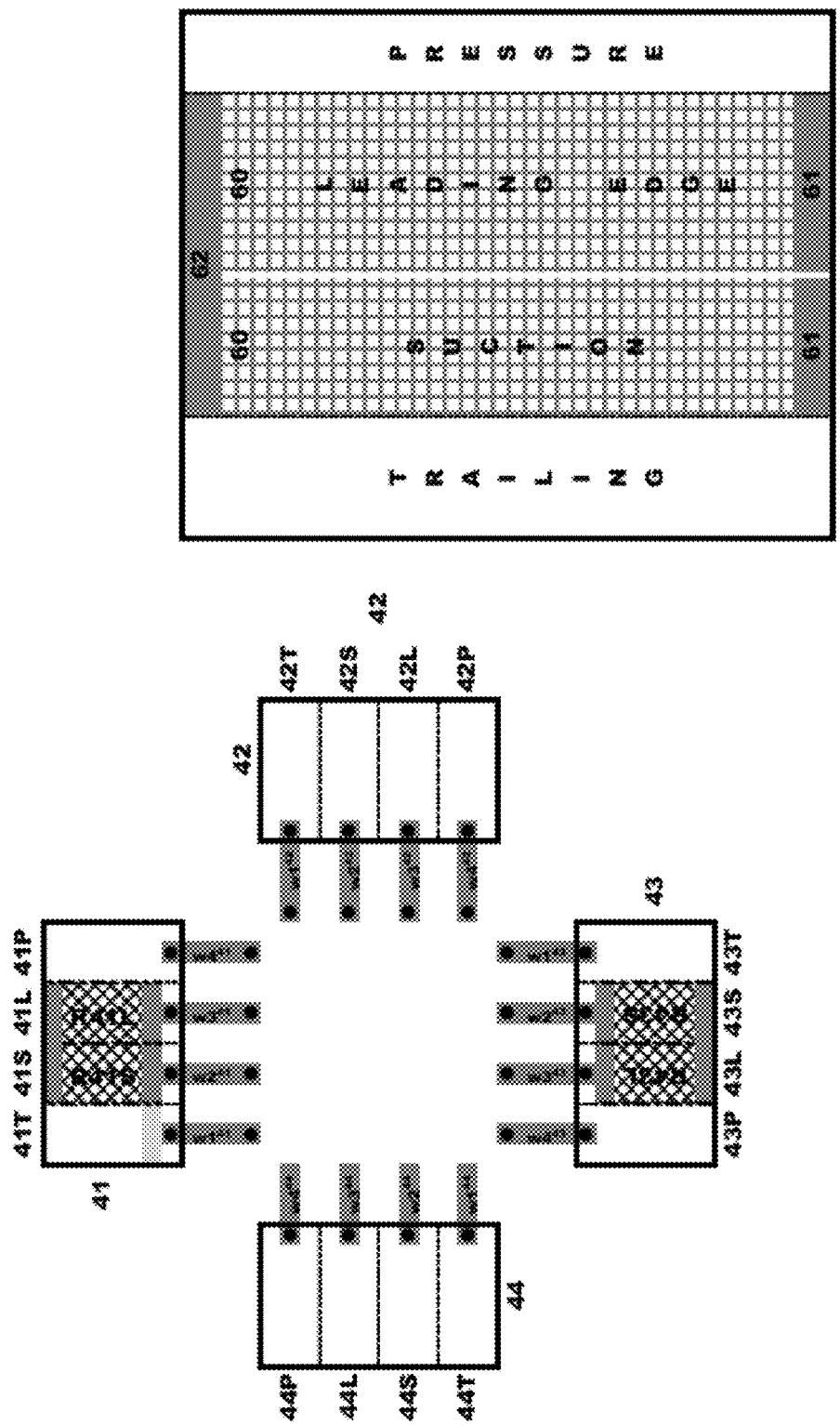
Figure 5C:
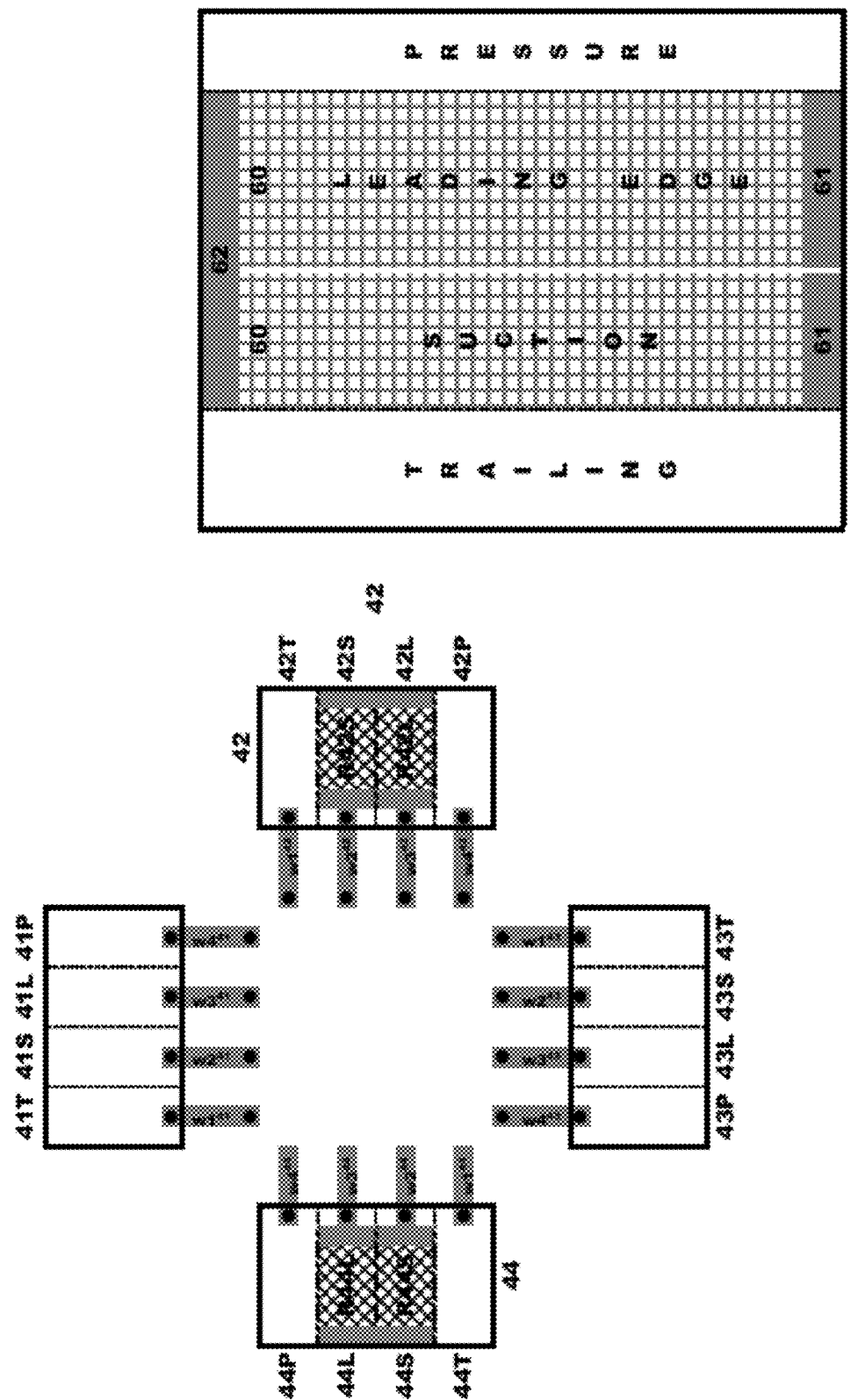

As shown in FIGS. 5A-5C, same-phase zones in an electrothermal device 41-44 can be formed from the same sheet of material. Each sheet can include a junction strip 61 for each wire and a junction strip 61 spanning the two sheets 60.

One may now appreciate that the ice protection system 40 can insure ice-protection synchronization and phase-to-phase load balance, while still offering lower package weight, easier assembly steps, simplified installation procedures, reduced problem points, and/or improved durability. While the aircraft 10, the rotor 30, the ice protection system 40, and/or the power system 50 have been shown and described with respect to a certain embodiment or embodiments, other equivalent alterations and modifications will occur to others skilled in the art upon the reading and understanding of this disclosure. For example, while the ice protection system 40 has been discussed with respect to the tail rotor 30 of a helicopter-type aircraft 10, it may be used on any constitution of related ice-susceptible components. The ice protection system 40 can be used on other rotor assemblies on the aircraft 10 (e.g., the main rotor 20), other aircraft designs, non-aircraft vehicles, and/or non-vehicle applications (e.g., wind turbines). And the electric loads R loads R can be provided by suitable heating elements (e.g., wire-based resistors, graphite fabric, etched ribbons, etc.).

The invention claimed is:

1. An ice protection system for a constitution of related ice-susceptible components, said ice protection system comprising a plurality of electrothermal devices for each component and a connector device;

each electrothermal device of the plurality of electrothermal devices having zones corresponding to respective surface regions on the ice-susceptible components;

the connector device including an A-phase connector for electrical connection to the A-phase of a three-phase power system, a B-phase connector for electrical connection to the B-phase of the three-phase power system, and a C-phase connector for electrical connection to the C-phase of the three-phase power system;

the each electrothermal device being electrically connected to two but not three of the connectors; the zones including A-phase zones whereat electrical power is supplied through the A-phase connector, B-phase zones whereat electrical power is supplied through the B-phase connector and C-phase zones whereat electrical power is supplied through the C-phase connector;

wherein the A-phase connector supplies electrical power sequentially to each of the electrothermal devices, the electrical power heating at least two zones in the electrothermal devices;

each zone involving an electric load which converts supplied electrical power into heat in such a manner that ice-removal is synchronized among the components; and the combined load of the A-phase zones, the combined load of the B-phase zones, and the combined load of the C-phase zones being approximately equal so as to insure phase-to-phase load balance.

2. An ice protection system as set forth in claim 1, wherein the number of electrothermal devices is not a multiple of three.

3. An ice protection system as set forth in claim 1, comprising four electrothermal devices.

4. An ice protection system as set forth in claim 1, wherein the electrical loads provided by heating elements wherein resistance is created by a strip of conductive material having a pattern holes arranged so that an electrical path must twist and turn around holes, with no straight line corridor to follow;

wherein same-phase zones in each electrothermal device are formed from the same sheet of conductive material; and wherein the sheet of conductive material comprises a junction strip for each zone and a junction strip spanning the two zones.

5. A constitution of related ice-susceptible components and an ice protection system set forth in claim 1, wherein the electrothermal devices are installed on the components so that the zones of the electrothermal devices correspond to respective surface regions on the ice-susceptible components.

6. An ice protection system as set forth in claim 1, and a three-phase AC power system, wherein the A-phase connector of the ice protection system is connected to an A-phase line of the power system, the B-phase connector of the ice protection system is connected to the B-phase line of the power system, and the C-phase connector of the ice protection system is connected the C-phase line of the power system.

7. An aircraft comprising a fuselage, a constitution of related ice-susceptible components, an ice protection system as set forth in claim 1, and a three-phase electrical power system;

wherein the electrothermal devices are installed on the components so that the zones of the electrothermal devices correspond to respective surface regions on the ice-susceptible components;

wherein the A-phase connector of the ice protection system is connected to an A-phase line of the power system, the B-phase connector of the ice protection system is connected to the B-phase line of the power system, and the C-phase connector of the ice protection system is connected the C-phase line of the power system; and wherein the A-phase connector supplies electrical power sequentially to each of the electrothermal devices, the electrical power heating at least two zones in the electrothermal devices.

8. An ice protection system as set forth in claim 1, wherein zones in each of the electrothermal devices receive electric power through a first one of the connectors.

9. An ice protection system as set forth in claim 8, wherein trailing zones and/or pressure zones in each of the electrothermal devices receive electric power through the first one of the connectors.

10. An ice protection system as set forth in claim 8, wherein the zones receive electric power through the first one of the connectors are connected in series.

11. An ice protection system as set forth in claim 8, wherein the zones of each the electrothermal devices connected to the first one of the connectors are arranged around an axis of rotation of the constitution.

12. An ice protection system as set forth in claim 8, wherein zones of two of the electrothermal devices receive electric power through a second one of the connectors.

13. An ice protection system as set forth in claim 12, wherein the zones of the two electrothermal devices receiving electric power through the second one of the connectors include leading-edge zones and/or suction zones.

14. An ice protection system as set forth in claim 12, wherein the zones of the two electrothermal devices receiving electric power through the second one of the connectors are situated across from each other relative to an axis of rotation of the constitution.

15. An ice protection system as set forth in claim 12, wherein zones of two other electrothermal devices receive electric power from a third one of the connectors.

16. An ice protection system as set forth in claim 15, wherein the zones of the two electrothermal devices receiving power from through the third one of the connectors include leading-edge zones and/or suction zones.

17. An ice protection system as set forth in claim 15, wherein the zones of the two electrothermal devices receiving power from through the third one of the connectors are connected in series.

18. An ice protection system as set forth in claim 15, wherein the zones of the two electrothermal devices receiving power from through the third one of the connectors are situated across from each other relative to an axis of rotation of the constitution.

19. An ice protection system as set forth in claim 15, wherein trailing zones and/or pressure zones in each of the electrothermal devices receive electric power through the first one of the connectors; wherein leading-edge zones and suction zones receive electric power through the second one of the connectors; and wherein leading-edge zones and suction zones receive electric power through the third one of the connectors.

20. An ice protection system as set forth in claim 19, wherein the zones of each the electrothermal devices connected to the first one of the connectors are arranged around an axis of rotation of the constitution;

wherein the zones of the two electrothermal devices receiving electric power through the second one of the connectors are situated across from each other relative to the axis of rotation of the constitution; and wherein the zones of the two electrothermal devices receiving power from through the third one of the connectors are situated across from each other relative to the axis of rotation of the constitution.

* * * * *